(12) United States Patent
Takasumi

(10) Patent No.: US 7,583,298 B2
(45) Date of Patent: Sep. 1, 2009

(54) ELECTRONIC CAMERA HAVING IMAGE FILE MANAGEMENT, AND SHOOTING METHOD AND REPLAYING METHOD FOR MANAGING IMAGE FILES

(75) Inventor: Shinya Takasumi, Tokyo (JP)

(73) Assignee: Olympus Corporation, Tokyo (JP)

( * ) Notice: Subject to any disclaimer, the term of this patent is extended or adjusted under 35 U.S.C. 154(b) by 819 days.

(21) Appl. No.: 10/637,464

(22) Filed: Aug. 8, 2003

(65) Prior Publication Data

US 2005/0073593 A1    Apr. 7, 2005

(30) Foreign Application Priority Data

Aug. 20, 2002  (JP)  .............................. 2002-239877

(51) Int. Cl.
*H04N 5/76* (2006.01)
(52) U.S. Cl. .................................. 348/231.2; 348/231.3
(58) Field of Classification Search .............. 348/231.3, 348/231.5, 231.6, 231.2
See application file for complete search history.

(56) References Cited

U.S. PATENT DOCUMENTS

| | | | | |
|---|---|---|---|---|
| 6,762,791 | B1 * | 7/2004 | Schuetzle | 348/231.3 |
| 6,928,230 | B2 * | 8/2005 | Squibbs | 386/46 |
| 7,030,914 | B2 * | 4/2006 | Yamagami | 348/231.2 |
| 7,102,670 | B2 * | 9/2006 | Seaman et al. | 348/231.6 |
| 2002/0140826 | A1 * | 10/2002 | Sato et al. | 348/222.1 |

FOREIGN PATENT DOCUMENTS

| | | |
|---|---|---|
| JP | 6-319103 | 11/1994 |
| JP | 2001069454 | 3/2001 |
| JP | 2001211418 | 8/2001 |

\* cited by examiner

*Primary Examiner*—Jason Chan
*Assistant Examiner*—Nicholas G Giles
(74) *Attorney, Agent, or Firm*—Volpe and Koenig P.C.

(57) ABSTRACT

An electronic camera, which stores shot images onto an insertable/removable recording medium, creates a tag information file before shooting which has information corresponding to a shot image and a file name associated with a file name of the shot image file in a one to one correspondence with the tag information file, and records the shot image file and the tag information file onto a shared recording medium.

23 Claims, 7 Drawing Sheets

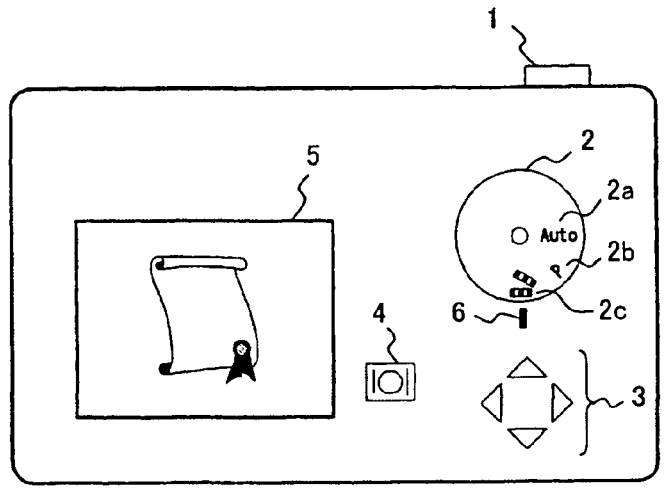
FIG. 1A
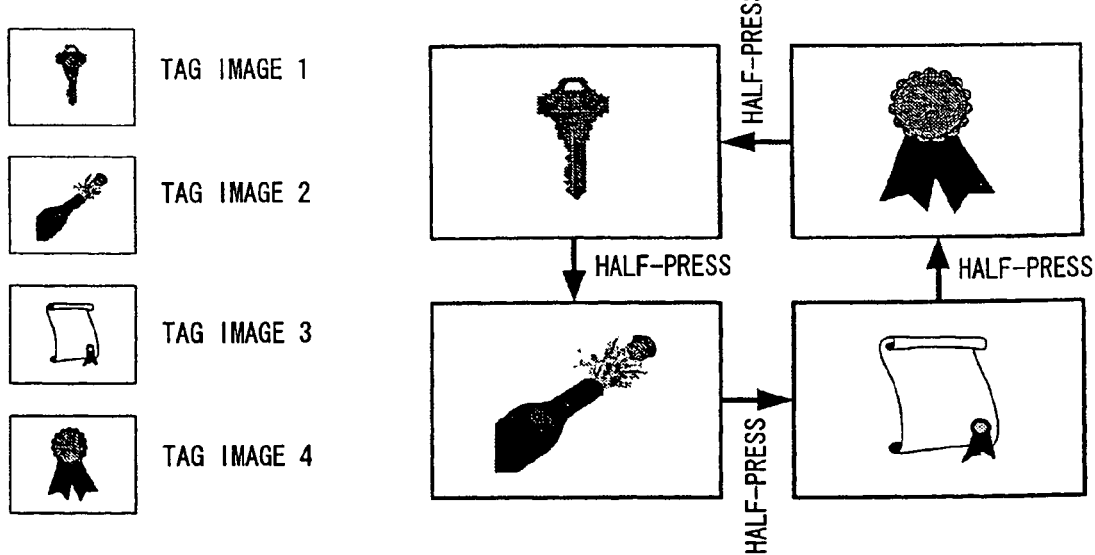
FIG. 1B
FIG. 1C

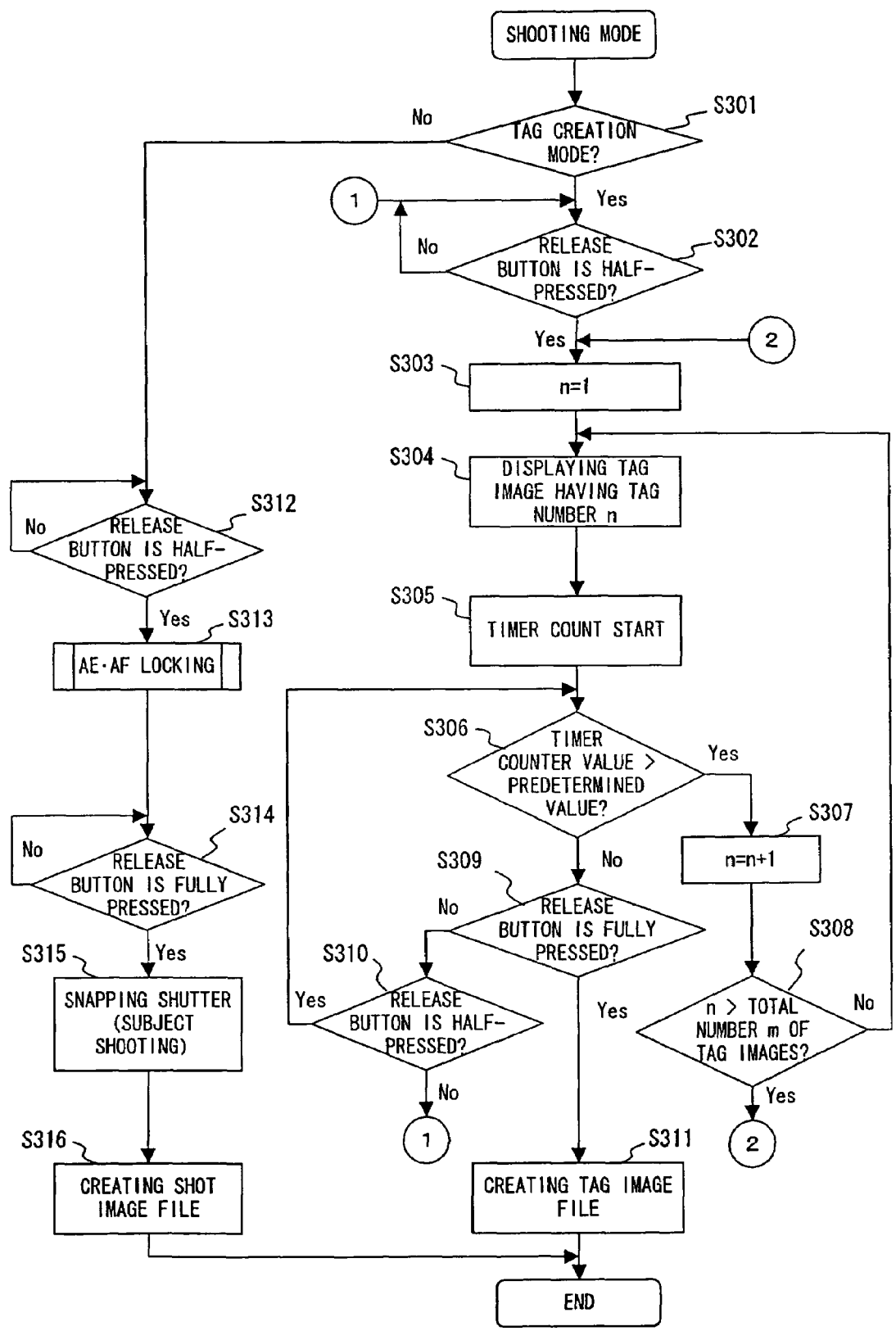
F I G. 3

| F0001.jpg | P0001.jpg | F0001.jpg |
| F0105.jpg | P0002.jpg | P0001.jpg |
| ... | P0003.jpg | P0002.jpg |
| P0001.jpg | ... | P0003.jpg |
| P0002.jpg | P0104.jpg | ... |
| P0003.jpg | P0105.jpg | |
| ... | P0106.jpg | P0104.jpg |
| | ... | P0105.jpg |
| P0104.jpg | | P0106.jpg |
| P0105.jpg | F0001.jpg | ... |
| P0106.jpg | F0105.jpg | |
| ... | ... | F0105.jpg |
| NAME ORDER | SIZE ORDER | DATE ORDER |

FIG. 6A  FIG. 6B  FIG. 6C

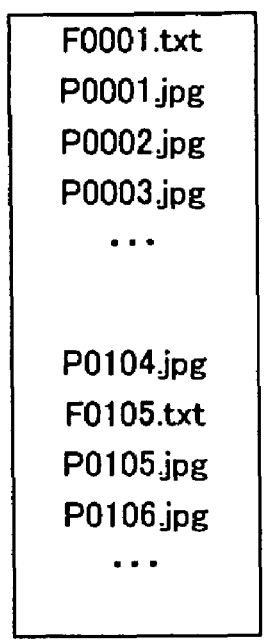
← TEXT FORMAT
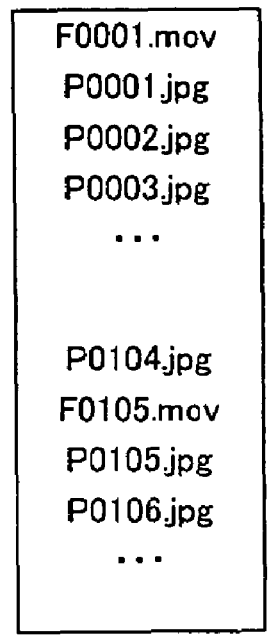
← MOVING IMAGE FORMAT
F I G. 7 A    F I G. 7 B
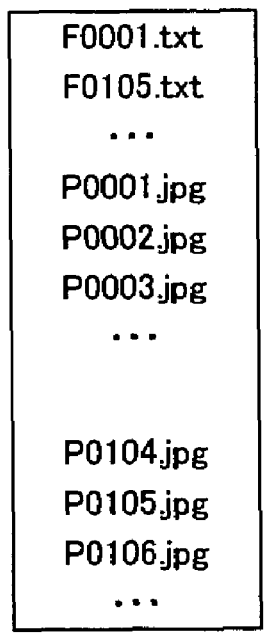
TYPE ORDER
F I G. 7 C

ELECTRONIC CAMERA HAVING IMAGE FILE MANAGEMENT, AND SHOOTING METHOD AND REPLAYING METHOD FOR MANAGING IMAGE FILES

CROSS REFERENCE TO RELATED APPLICATIONS

This application is based upon and claims the benefit of priority from the prior Japanese Patent Application No. 2002-239877, filed Aug. 20, 2002, the entire contents of which are incorporated herein by reference.

BACKGROUND

The present invention relates to an electronic camera, and a shooting method and a replaying method, which are applied thereto.

In recent years, electronic cameras have been rapidly popularized, and a recording capacity per recording medium for an electronic camera, such as a memory card, etc. has been increasing.

However, with an increase in the recording capacity of a recording medium, images for many shooting scenes are included onto one recording medium, so that it becomes more and more difficult to grasp and manage shot image files.

Generally, shot image files recorded onto a recording medium by an electronic camera are transferred to a fixed or removable recording medium of an external device such as a personal computer system in many cases. Upon completion of the transfer, the recording medium is initialized with entire erasure or a formatting operation, and reused as a recording medium for recording a shot image.

It is desirable that the shot image files transferred from the electronic camera, for example, to the personal computer system, can be handled as a meaningful image file group in consideration of subsequent image processing. Accordingly, application software suitable for image processing is required, which enables thumbnail images to be listed and displayed, enables a shot image file to be easily renamed, etc. Many pieces of such software for image processing, which are distributed with or without cost, are known. However, various problems remain in terms of their operability, functions, prices, etc.

Also a computer system environment for the above described software must be considered. However, operations such as an operation for suitably creating a folder for storing a shot image file, an operation for assigning shooting date and time as a file name, etc., are merely performed to cope with such an environment when shooting is performed with an electronic camera, and a complete solution to the above described problem has not yet been proposed.

SUMMARY OF THE INVENTION

The present invention was developed in view of the above described technical problems, and aims at providing a method enabling a plurality of shot image files recorded onto a shared recording medium to be handled as a meaningful image group before or after shooting, and an electronic camera to which the method is applicable.

One preferred embodiment according to the present invention is an electronic camera that stores shot images onto an insertable/removable recording medium, and is configured to create a tag information file before shooting, which has information corresponding to a shot image and a file name associated with the file name of the shot image file in a one to one correspondence with the tag information file, and to record the shot image file and the tag information file onto a shared recording medium.

With the above described configuration, the shot image file and the tag information file, to which the file name is associated in a one to one correspondence with the file name of the shot image file, are recorded onto a shared recording medium at the time of shooting. As a result, a plurality of shot image files can be handled as a meaningful image group. For example, if a user desires to provide a delimiter so as to make a distinction between images shot so far and images to be shot from now on when changing a shooting target, a shooting site, etc., creating/recording a tag information file facilitates making the distinction afterward.

Another preferred embodiment according to the present invention is an electronic camera that can replay a shot image stored onto an insertable/removable recording medium, and is configured to create a tag information file, which has a one to one correspondence with a recorded shot image file, when the recorded shot image file is replayed, and to add the tag information file to a recording medium shared by the recorded shot image file.

With the above described configuration, a tag information file, which has a one to one correspondence with an already recorded shot image file, is added and recorded onto a recording medium where the shot image file is recorded at the time of replay. As a result, a plurality of shot image files can be handled as a meaningful image group. For example, if a delimiter is desired to be provided so as to make a distinction about whether a plurality of already shot (recorded) images are either a particular shot image group or another shot image group during replay, creating/recording a tag image file facilitates making the distinction afterward.

BRIEF DESCRIPTION OF THE DRAWINGS

FIG. 1A shows the outer appearance of an electronic camera according to one preferred embodiment of the present invention;

FIG. 1B exemplifies tag images registered to the electronic camera;

FIG. 1C exemplifies a display screen made to appear on an LCD of the electronic camera;

FIG. 3 is a flowchart exemplifying a tag information process performed in shooting mode;

FIG. 6A exemplifies a display screen when transferred image files are listed and displayed in name order;

FIG. 6B exemplifies a display screen when the transferred image files are listed and displayed in size order;

FIG. 6C exemplifies a display screen when the transferred image files are listed and displayed in shooting date order;

FIG. 7A shows an example where tag character files are recorded onto a medium;

FIG. 7B shows an example where tag moving image files are recorded onto a medium; and FIG. 7C exemplifies a display screen when the tag character files and the shot image files, which are shown in FIG. 7A, are transferred to an external device, which lists and displays the transferred image files in type order.

DESCRIPTION OF THE PREFERRED EMBODIMENTS

Figure 2:
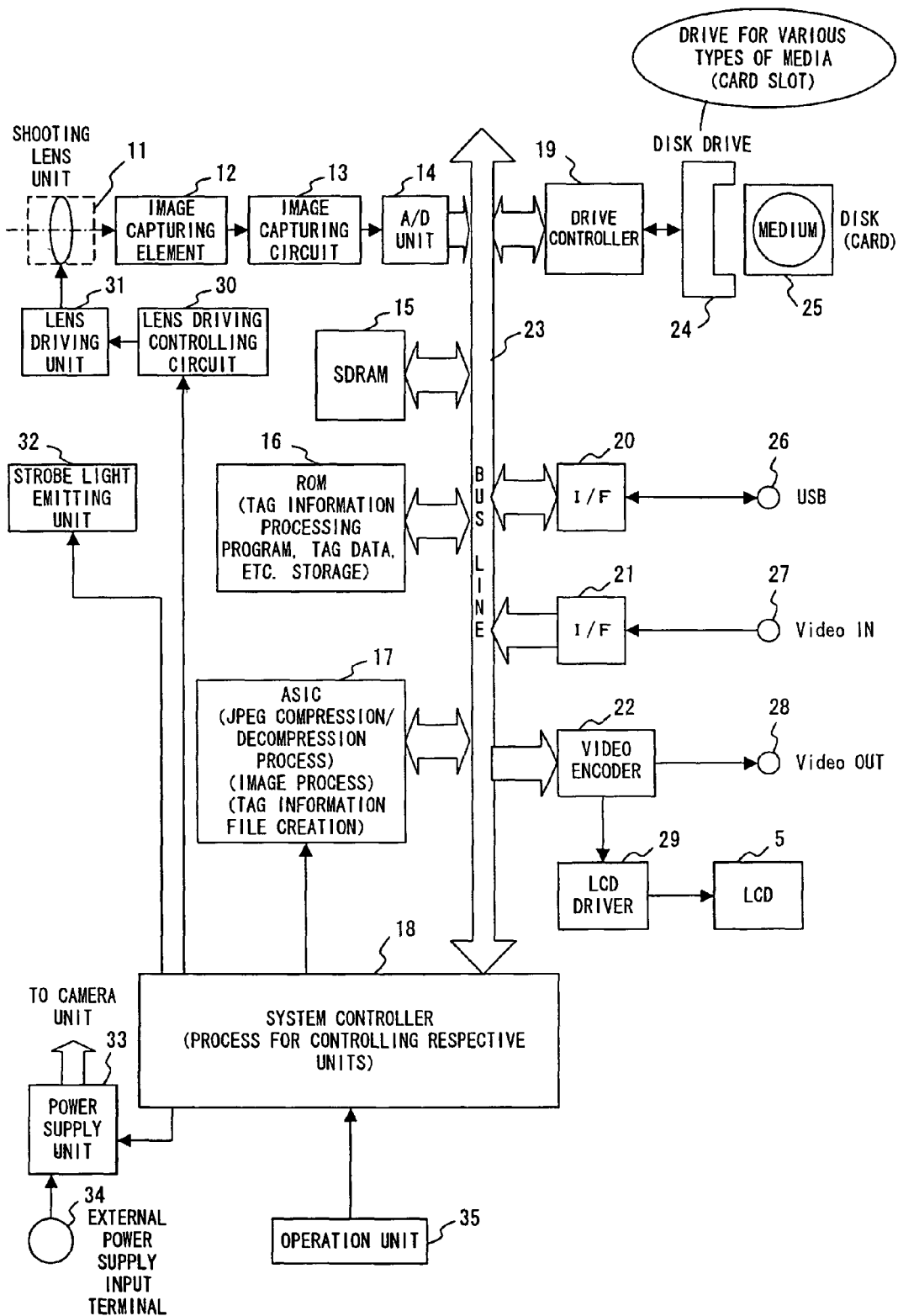
FIG. 2 shows the system configuration of the electronic camera.

Hereinafter, a preferred embodiment according to the present invention is described with reference to the drawings.

FIG. 1A shows the outer appearance of an electronic camera according to one preferred embodiment of the present invention, and shows the rough configuration of the back of the camera. FIG. 1B exemplifies tag images registered to this electronic camera. FIG. 1C exemplifies a display screen made to appear on an LCD (Liquid Crystal Display) of this electronic camera.

In FIG. 1A, a release button 1, etc. are provided on the top face of this electronic camera. The release button 1 is intended to instruct to prepare for shooting, such as AF (Automatic Focus) process, AE (Automatic Exposure) process, etc., to instruct to make shooting, or to instruct to display and select a tag image.

In this preferred embodiment, if the release button 1 continues to be half-pressed when tag creation mode to be described later is instructed to be set, tag images are instructed to be displayed on an LCD 5 at predetermined time intervals. If the release button 1 is fully pressed at that time, a tag image displayed on the LCD 5 at that time is instructed to be selected.

For example, if the tag creation mode is set and the release button 1 continues to be half-pressed when the tag images 1 to 4, which are shown as tag images in FIG. 1B, are registered to this electronic camera, the tag images 1 to 4 are displayed in turn on the LCD 5 at predetermined time intervals as shown in FIG. 1C. Here, the release button 1 is fully pressed, whereby the tag image displayed on the LCD 5 at that time is selected.

The tag creation mode is a mode that enables a plurality of shot images recorded by shooting to be handled as a meaningful image group, and is suitable for managing shot images. A desired tag image is selected when the tag creation mode is set, whereby a process is performed in which a tag image file (an example of a tag information file), having a file name associated, in a one to one correspondence, with a file name of an image to be shot, is created as a file of the tag image, and the tag image file and the file of the image to be shot from now on are recorded onto a shared medium (recoding medium). Or, a process is performed in which a tag image file, having a file name associated in a one to one correspondence with the file name of an already shot image, is created as a file of the tag image, and the tag image file is recorded onto a medium where the file of the already shot image is recorded.

For example, if a user desires to provide a delimiter so as to make a distinction between images shot so far and images to be shot from now on when changing a shooting target or a shooting site at the time of shooting (in shooting mode), or if a user desires to provide a delimiter so as to make a distinction about whether a plurality of already shot images are either a particular shot image group or another shot image group, the user sets the tag creation mode and selects a desired tag image, whereby an associated shot image group can be easily determined from among a plurality of shot images only by confirming the file name of the file of the tag image afterward.

In the meantime, if the tag creation mode is not instructed to be set, shooting is instructed to be prepared if the release button 1 is half-pressed, and shooting is instructed if the release button 1 is fully pressed, as usual.

With the electronic camera according to this preferred embodiment, file names using serial numbers such as "P0001.jpg", "P0002.jpg", "P0003.jpg", etc. are assumed to be given to shot image files in shooting order.

Furthermore, a shooting mode dial 2, a cross key 3, a replay button 4, an LCD 5, etc. are provided on the back of the camera.

The shooting mode dial 2 is provided to set various types of modes such as auto-mode, program mode, the above described tag creation mode, etc. On the surface of the shooting mode dial 2, a mark 2a (Auto) indicating the auto-mode, a mark 2b (P) indicating the program mode, a mark 2c indicating the tag creation mode, etc. are put. Dial 2 is turned to align a desired mark with an indicator 6, so that the mode indicated by the mark moved to the indicator 6 is instructed to be set.

The cross key array 3 is provided to select an image, or an item in various types of menus, which are displayed on the LCD 5.

The replay button 4 is provided to set the replay mode that enables an image, which is recorded onto a medium inserted in this electronic camera, to be replayed.

The LCD 5 is a display unit on which a shot image, a tag image, various types of menu items, etc. are displayed. In the example shown in FIG. 1A, the tag image 3 of FIG. 1B is displayed.

System configuration of this electronic camera is described next with reference to FIG. 2.

In this figure, a shooting lens unit 11 is configured by including a zoom lens, an aperture, a focus lens, etc., and forms a subject image on an image capturing element 12.

The image capturing element 12 is, for example, a CCD (Charge Coupled Device), and outputs an electric signal which represents an image by opto-electrically converting the subject image formed on the image capturing element 12 with an operation of the shooting lens unit 11.

An image capturing circuit 13 provides CDS (Correlated Double Sampling) for reducing a noise component, AGC (Automatic Gain control) for stabilizing a signal level, etc., and outputs an analog electric signal output from the image capturing element 12 by reducing its noise component and by stabilizing its signal level.

An A/D unit 14 converts the analog electric signal, which is an output from the image capturing circuit 13, into a digital electric signal, and outputs the digital electric signal.

Furthermore, all of the A/D unit 14, an SDRAM 15, a ROM 16, an ASIC 17, a system controller 18, a drive controller 19, I/Fs 20 and 21, and a video encoder 22 are connected to a bus line 23, and configured to be able to mutually exchange data.

The SDRAM (Synchronous Dynamic Random Access Memory) 15 is a memory used to temporarily store image data (digital electric signals) output from the A/D unit 14, image data being processed in various types of image processing performed by the ASIC 17, and the like, or used as a working area for performing a control process performed by the system controller 18, or the like.

The ROM 16 is a memory in which a camera program (including a tag information processing program) executed by a CPU of the system controller 18, tag image data (still image information), etc. are prestored.

The ASIC (Application Specific Integrated Circuit) 17 performs a compression/decompression process for image data with a JPEG (Joint Photographic Experts Group) method for recording/replaying image data, various types of image processing such as a gamma correction, a white balance correction, a resize process, etc., a tag image file creation process for creating a tag image file by adding header information (supplementary information) to tag image data stored in the SDRAM 15, and the like under the control of the system controller 18.

The system controller 18 comprises the CPU, etc., and controls the entire operations of the electric camera in a way such that the CPU reads and executes the camera program prestored in the ROM 16.

The drive controller 19 connects the medium 25 inserted in a disk drive 24 (such as a card slot, etc.) and the bus line 23 by controlling the disk drive 24, and enables a data exchange between a constituent element (such as the ASIC 17, etc.) connected to the bus line 23 and the medium 25.

The medium 25 is an insertable/removable recording medium where image data (still image data or moving image data) that is obtained via the image capturing element 12, etc. and compressed by the ASIC 17, and the like are recorded, and is, for example, a memory card, a magneto-optical disk (MO), an ultra-compact card type hard disk, etc.

The I/F 20 is an interface conforming to a USB (Universal Serial Bus) standard, connects an external device such as a PC (Personal Computer) connected to a USB terminal 26 and the bus line 23, and enables a data exchange between a constituent element connected to the bus line 23 and the external device connected to the USB terminal. With this interface, for example, image data recorded onto the medium 25 can be output to a PC connected to the USB terminal 26.

The I/F unit 21 is an interface for connecting an external device connected to a video input terminal 27 and the bus line 23, and allows a video signal output from the external device connected to the video input terminal 27 to be output to a constituent element connected to the bus line 23 by converting the video signal into data that can be processed by the constituent element connected to the bus line 23.

The video encoder 22 converts image data, which is recorded onto the medium 25 and decompressed by the ASIC 17, or the like into a video signal, and outputs the video signal to an external display unit such as a television, etc. connected to a video output terminal 28. Alternatively, the video encoder 22 outputs the image data, which is decompressed by the ASIC 17, etc., to an LCD driver 29.

The LCD driver 29 drives the LCD 5 based on the image data output from the video encoder 22, and controls the LCD 5 to display an image based on the image data.

A lens driving controlling circuit 30 controls the lens driving unit 31 under the control of the system controller 18, and the lens driving unit 31 moves a focus lens or a zoom lens of the shooting lens unit 11 under the control of the lens driving controlling circuit 30.

A strobe light emitting unit 32 emits a strobe light under the control of the system controller 18.

A power supply unit 33 supplies power of an external power supply (AC power supply) input from an external power supply input terminal 34 to the respective units of the electronic camera under the control of the system controller 18.

An operation unit 35 accepts various types of instructions from a user, and notifies the system controller 18 of an accepted instruction. The operation unit 35 includes the above described release button 1, shooting mode dial 2, cross key array 3, replay button 4, etc.

The control process of this electronic camera is described next. The CPU of the system controller 18 reads and executes the camera program stored in the ROM 16, so that this control process is performed.

FIG. 3 is a flowchart exemplifying a tag information process performed in the shooting mode. This process is a process that is repeatedly performed until the operation mode is switched from the shooting mode to another mode (such as the replay mode).

In this figure, firstly, at S301, it is determined whether or not the tag creation mode is instructed to be set according to a turning position of the shooting mode dial 2. If a result of this determination is "Yes", the process proceeds to S302 where a tag image file creation process is started. If the result of the determination is "No" (if the operation mode is, for example, the auto-mode, the program mode, etc.), the process proceeds to S312 where a normal shooting process is started.

In S302, it is determined whether or not the release button 1 is half-pressed. If a result of this determination is "Yes", the process proceeds to S303. If the result of the determination is "No", this step is repeated.

In S303, the value of n is set to 1 (n=1).

In S304, a tag image (tag image data) that has a tag number n and is stored in the ROM 16 is read out and displayed on the LCD 5. In this flow, it is assumed that m tag images having tag numbers 1 to m are stored in the ROM 16.

In S305, a timer count starts.

In 306, it is determined whether or not the value of the timer count is larger than a predetermined value. If a result of this determination is "Yes", the process proceeds to S307. If the result of the determination is "No", the process proceeds to S309. The predetermined value indicates a display time interval when the respective tag images are displayed in turn.

In S307, the value of n is incremented (n=n+1).

In S308, it is determined whether or not the value of n is larger than the value of m (n>m). If a result of this determination is "Yes", the process returns to S303. If the result of the determination is "No", the process returns to S304. With such a determination process, the display restarts from the tag image having the tag number 1 if the value of n exceeds the total number m of the tag images stored in the ROM 16.

In S309, it is determined whether or not the release button 1 is fully pressed. If a result of this determination is "Yes", the process proceeds to S311. If the result of the determination is "No", the process proceeds to S310.

In S310, it is determined whether or not the release button is half-pressed. If a result of this determination is "Yes", the process returns to S306. If the result of the determination is "No", the process returns to S302. With such a determination process, the respective tag images are displayed on the LCD 5 in turn at predetermined time intervals indicated by the above described predetermined value, while the release button 1 continues to be half-pressed.

In S311, a tag image file is created. Namely, a tag image file, having a file name associated in a one to one correspondence with the file name of an image to be actually shot (to be shot next), is composed of tag image data (after being compressed) of the tag image which is displayed on the LCD 5 when the release button 1 is fully pressed in the above described S309, and header information including the tag number n of the tag image, the creation date and time of the tag image file, formatting date and time of a medium onto which the tag image file is to be recorded (medium inserted in this electronic camera). The file name of the tag image file, etc., is created, and recorded onto the medium 25.

For example, if the file name of an image shot last is "P0105.jpg", the file name of the image to be shot next will become "P0106.jpg". Therefore, the file name of the tag image file will become "F0106.jpg". Or, if there are no images shot (no shot images are recorded onto the medium), the file name of the image to be shot next will become "P001.jpg", and accordingly, the file name of the tag image file will become "F0001.jpg".

This preferred embodiment assumes that a file having a file name that starts with a character "P" indicates a shot image file, whereas a file having a file name that starts with "F" indicates a tag image file.

Additionally, during the above described step S311, the header information may be configured to include at least any one or a plurality of items of the above described tag number n, creation date and time of the tag image file, formatting date and time of the medium onto which the tag image file is to be recorded, and the file name of the tag image file.

In the meantime, at S312 where the normal shooting process is started, it is determined whether or not the release button 1 is half-pressed. If a result of this determination is "Yes", the process proceeds to S313. If the result of the determination is "No", this step is repeated.

In S313, an AE process and an AF process are performed, and shooting conditions (such as a shutter speed, an exposure value, etc.) according to a subject, and the like are set.

In S314, it is determined whether or not the release button 1 is fully pressed. If a result of this determination is "Yes", the process proceeds to S315. If the result of the determination is "No", this step is repeated.

At S315, the shooting process for the subject is actually performed under the shooting conditions, etc. set by the process of S313, and image data according to the subject is obtained.

At S316, a shot image file is created. Namely, the shot image file, which has a file name succeeding the file name of the image shot last time, and is composed of the image data obtained in the preceding step, and header information including the shooting date and time and the shooting conditions (the shutter speed, the exposure value, etc.) at the time of shooting, is created, and recorded onto the medium 25.

When the process for creating a tag image file in S311, or the process for creating a shot image file in S316 is terminated as described above, this flow is completed.

The CPU of the system controller 18 performs the process represented by this flow, whereby the file name of a tag image file and that of a shot image file are associated in a one to one correspondence, and recorded onto the medium 25 which is a shared recording medium when a mode (such as the auto-mode, the program mode, etc.) other than the tag creation mode is set and shooting is made, after a desired tag image is selected and the tag image file is created/recorded in the tag creation mode. In this way, a user instructs setting of the tag creation mode, and selects a desired tag image when changing, for example, a shooting target or a shooting site, whereby a tag image file, which has a file name effective for making a distinction between images shot so far and images to be shot from now on, can be recorded.

Figure 4:
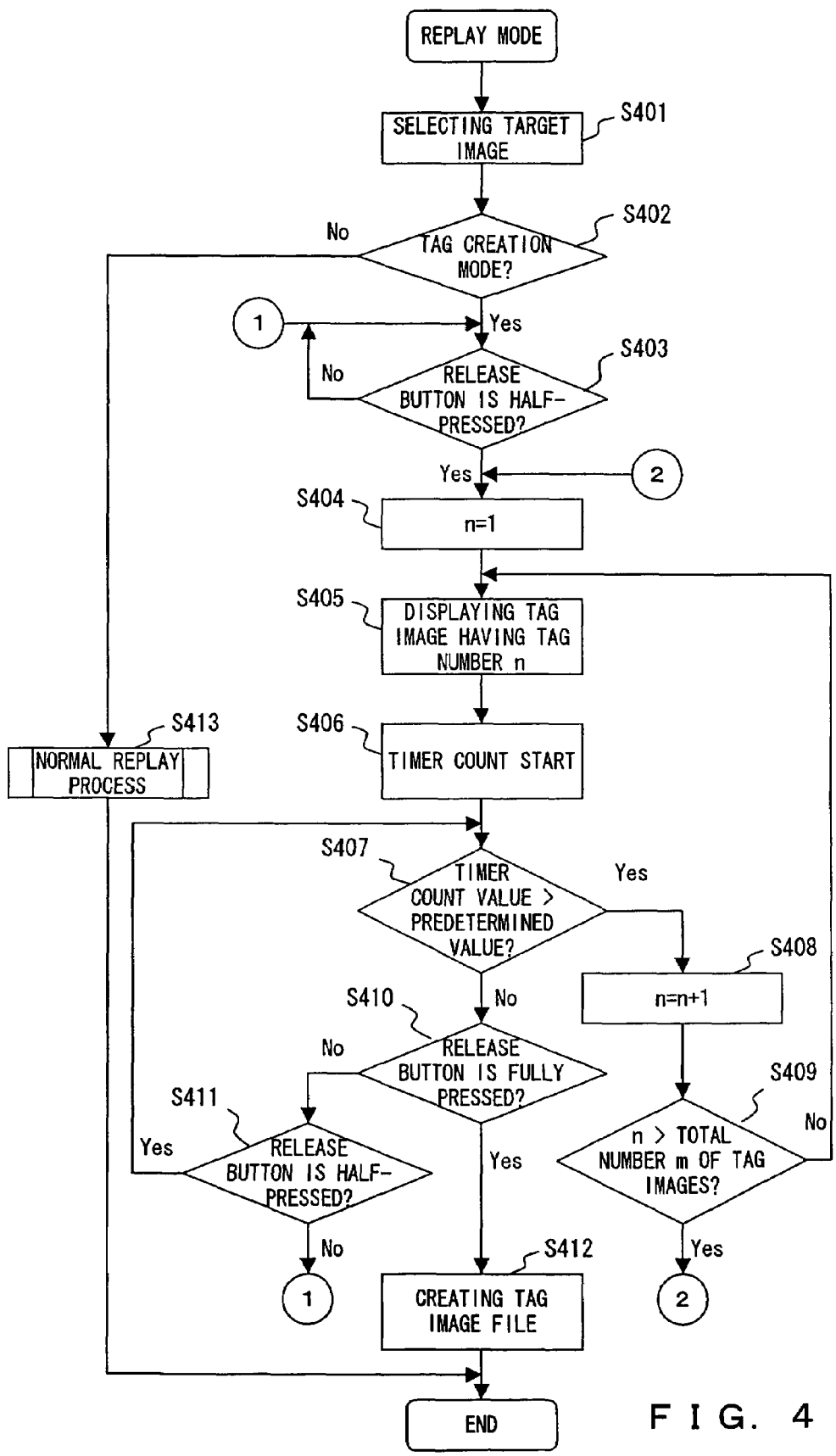
FIG. 4 is a flowchart exemplifying a tag information process performed in replay mode.

FIG. 4 is a flowchart exemplifying a tag information process performed in the replay mode. This process is started by setting the replay mode with a press of the replay button 4, and is repeatedly performed until the operation mode is switched from the replay mode to another mode (such as the shooting mode).

In this figure, firstly, at S401, a target image is selected. Specifically, a desired shot image that is displayed on the LCD 5 according to an operation of the cross key array 3, and recorded onto the medium 25 is selected.

At S402, it is determined whether or not the tag creation mode is instructed to be set according to the position of the shooting mode dial 2. If a result of this determination is "Yes", the process proceeds to S403 where a tag image file creation process is started. If the result of the determination is "No", the process proceeds to S413 where a normal replay process is performed.

In the following steps S403 to S411, processes similar to those in S302 to S310 shown in the above described FIG. 3 are performed and a description of these steps have been omitted for purposes of brevity.

At S412, a tag image file is created. Namely, the tag image file, which has a file name associated in a one to one correspondence with the file name of the target image selected in the above described S401, and is composed of tag image data (after being compressed) of a tag image displayed on the LCD 5 when the release button 1 is fully pressed in S410, and header information including the tag number n of the tag image, creation date and time of the tag image file, formatting date and time of a medium (medium inserted in this electronic camera) onto which the tag image file is to be recorded, the file name of the tag image file, and the like, is created, and recorded onto the medium 25.

For example, if the file name of the selected target image is "P0105.jpg", the file name of the tag image file will become "F0105.jpg".

In the meantime, at S413 where the normal replay process is performed, the process for replaying the target image selected in the above described S401 is performed.

When the process for creating the tag image file at S412, or the normal replay process at S413 is terminated as described above, this flow is completed.

The CPU of the system controller 18 performs the process represented by this flow, whereby the file name of a tag image file is associated in a one to one correspondence with the file name of a target image file, and recorded onto the medium 25, which is a shared recording medium, after the target image is selected, the target creation mode is set, and the desired target image is selected. As a result, a user can record a tag image file having a file name effective for making a distinction between an associated shot image group and another shot image group by selecting a shot image, which will become a delimiter of the associated shot image group, for example, like a shot image which serves as a delimiter of a shot image group whose shooting target, shooting site, etc. are different, by setting the tag creation mode, and by selecting a desired tag image, while replaying shot images recorded onto the medium 25.

The process of S413 in this flow may be configured to replay a tag image if the target image is the tag image based on an already created tag image file.

Additionally, a process for erasing a shot image (shot image file), which becomes an instruction target, from the medium 25 is performed when the shot image displayed (replayed) on the LCD 5 is instructed to be erased in the replay mode, although this is not shown in this flow. Note that, however, if the erased shot image file is, for example, a shot image file having a file name associated in a one to one correspondence with the file name of a tag image file, the file name of the tag image file is renamed to the file name of the shot image file recorded next to the erased shot image file among shot image files recorded onto the medium 25 in such a case. This is because the association between the tag image file and the shot image file is lost. Namely, the file name of the tag image file is processed to be renamed to the file name of the shot image file, to which is a number that is subsequent to the number given to the file name of the erased shot image file and is closest to that number is given. In this way, the correspondence between the tag image file and the shot image file can be properly maintained while keeping the association before the erasure.

For example, if a shot image file "P0105.jpg" is erased when a tag image file "F0105.jpg", and shot image files "P0105.jpg", "P0106.jpg", etc. are recorded onto the medium 25, the file name of the tag image file "F0105.jpg" is renamed to "F0106.jpg", which is associated with the shot image file "P0106.jpg".

The structure of a tag image file created by the flows represented by the above described FIGS. 3 and 4, and tag image files and shot image files, which are recorded onto the medium 25, are described next with reference to FIGS. 5A and 5B.

Figure 5A:
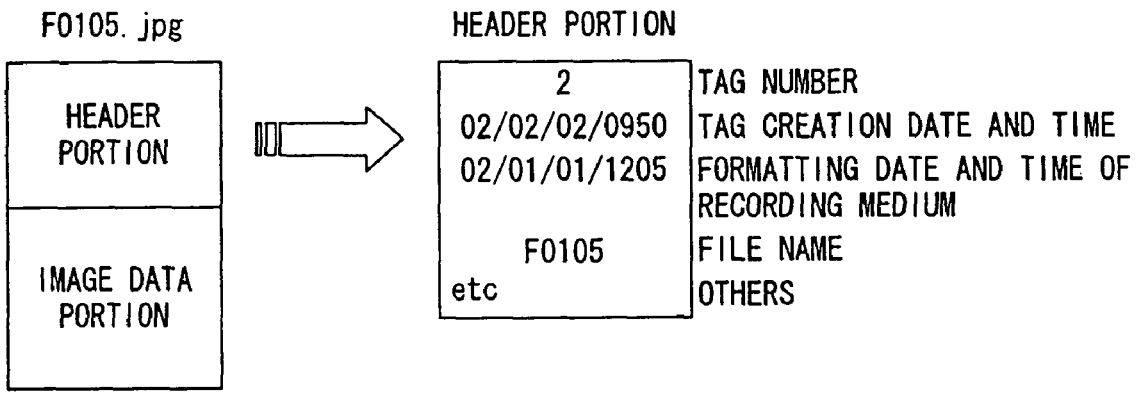
FIG. 5A shows the structure of a tag image file.

FIG. 5A shows the structure of the tag image file (assumed to be "F0105.jpg" here) created with the process of the above described steps S311 or S412.

As shown in FIG. 5A, the tag image file conforms to an image file format such as Exif (Exchangeable image file format), etc. similar to a shot image file, and is composed of an image data portion and a header portion. The image data portion includes tag image data representing a tag image, whereas the header portion includes header information such as the tag number of a tag image, creation date and time (tag creation date and time) of a tag image file, formatting date and time of the medium 25 onto which the tag image file is to be recorded, the file name of the tag image file, other items, etc.

The example shown in FIG. 5A is an example which includes information indicating that the tag number is "2", the creation date and time of the tag image file is "02/02/02/0950", the formatting date and time of the medium 25 is "02/01/01/1205", and the file name is "F0105".

Note that the header portion of a shot image file may include the formatting date and time of the medium 25. In this way, files whose formatting dates and times are the same, namely, a shot image file and a tag image file, which are recorded onto the same medium, can be determined among a plurality of image files afterward.

Additionally, in the shooting mode, for a shot image file obtained by shooting between when a tag image file is created/recorded and when the next tag image file is created/recorded, its header portion may include tag creation date and time, which is included in the header portion of the recorded tag image file. In this way, a shot image file whose tag creation date and time is the same can be determined as a file subordinate to the tag image file afterward.

Figure 5B:
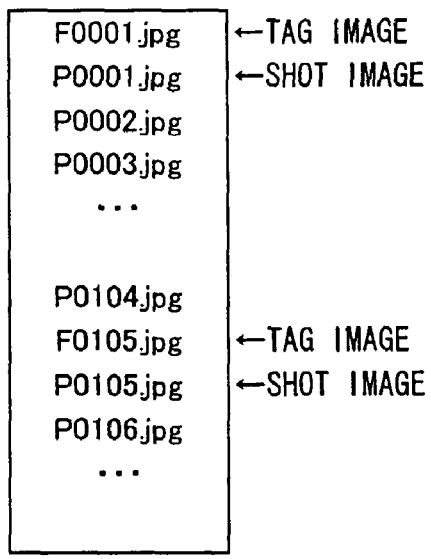
FIG. 5B shows tag image files and shot image files, which are recorded onto a medium.

FIG. 5B shows the listing of tag image files and shot image files, which are recorded onto the medium 25, which is arranged in the order of numbers given to the file names.

In FIG. 5B, a tag image "F0001.jpg" or "F0105.jpg" is recorded when a user sets the tag creation mode and selects a desired tag image before a shot image "P0001.jpg" or "P0105.jpg" is obtained (shot) in the shooting mode.

For example, the tag image "F0105.jpg" is created/recorded if a user desires to provide a delimiter so as to make a distinction between the image "P0104.jpg" and its prior images shot so far, and the image "P0105.jpg" and its subsequent images to be shot from now when changing a shooting target or a shooting site. In this way, the user only confirms the file name of "F0105.jpg" afterward, so that the user can easily make a distinction between the shot images (the image "P0104.jpg" and its prior images) before the shooting target, etc. are changed, and the shot images (the image "P0105.jpg" and its subsequent images) after the shooting target, etc. are changed.

Alternatively, the tag image "F0001.jpg" or "F0105.jpg" is recorded when a user sets the tag creation mode and selects a desired tag image when "P0001.jpg" or "P0105.jpg" is replayed in the replay mode.

For example, the tag image "F0105.jpg" is created and recorded if a user desires to provide a delimiter so as to make a distinction between a particular already shot image group "P0001.jpg" to "P0104.jpg", and another shot image group "P0105.jpg" and its subsequent images. As a result, the user only confirms the file name of "F0105.jpg" afterward, whereby the user can easily make a distinction between the particular shot image group "P0001.jpg" to "P0104.jpg", and the other shot image group "P0105.jpg" and its subsequent images.

In this preferred embodiment, "F0001.jpg" shown in FIG. 5B, namely, the first tag image file may be automatically created when the medium 25 is formatted.

An example of a display screen when the tag image files and the shot image files, which are shown in the above described FIG. 5B and recorded onto the medium 25, are transferred to an external device (such as a personal computer system, etc.), which lists and displays the transferred image files, is described next. The external device is assumed to comprise a function for arranging, listing, and displaying image files in name order (file name order), in size order (capacity order), in shooting date order, or the like.

FIGS. 6A, 6B, and 6C show examples of such a display screen.

FIG. 6A exemplifies a display screen when the transferred image files are listed and displayed in name order. In the example shown in FIG. 6A, the tag image files are displayed at first, and the shot image files are then displayed in name order. With this display screen, a user confirms the file names of the tag image files, whereby the user can extract associated shot image files among the transferred image files. For example, the file names of the tag image files "F0001.jpg" and "F0105.jpg" are confirmed, whereby the shot image files "P0001.jpg" to "P0104.jpg" can be determined as associated shot image files (for example, the shooting target, the shooting site, etc. are the same), and the associated shot image file group can be easily extracted.

FIG. 6B exemplifies a display screen when the transferred image files are listed and displayed in size order. In the example shown in FIG. 6B, the shot image files are displayed at first, and the tag image files are then displayed in size order. Also in such a case, a user confirms the file names of the tag image files, whereby the user can extract associated shot image files from among the transferred image files. The example shown in FIG. 6B is an example where both the shot image files and the tag image files are arranged and displayed in name order as a result of listing and displaying the image files in size order.

FIG. 6C exemplifies a display screen when the transferred image files are listed and displayed in shooting date order. For the tag image files, their tag creation dates and times are handled as shooting dates. In the example shown in FIG. 6C, the tag image file "F0001.jpg" is displayed at first, the shot image files are then displayed, and the tag image file "F0105.jpg" is displayed last in shooting date order. Also in such a case, a user can extract associated shot image files from among the transferred image files by confirming the file names of the tag image files.

As described above, as shown in FIGS. 6A, 6B, and 6C, even if the transferred image files are arranged, listed, and displayed in any order, a user can easily determine an associated shot image file group by confirming the file names of the tag image files without using particular software for image processing. Accordingly, an associated shot image file group can be extracted with ease.

Additionally, if formatting date and time is included in the header information of an image file as described above, image files recorded onto the same medium can be easily extracted by extracting image files whose formatting dates and times are the same with a reference to the formatting dates and times included in the header information of the transferred image files, even in the case where the transferred files are stored in separate folders (or directories).

As described above, according to this preferred embodiment, in the shooting mode or in the replay mode, a user sets the tag creation mode, and selects his or her desired tag image at an image where the user desires to provide a delimiter, whereby a tag image file to which a file name is associated in a one to one correspondence with the file name of the shot image file, which will become the delimiter, is given can be recorded to the medium 25. Furthermore, afterward, when the image files recorded onto the medium 25 are transferred to an external device such as a personal computer system, etc., which lists and displays the image files, a user only confirms the file name of a tag image file, whereby an associated shot image group can be easily determined and extracted. This facilitates the management of shot images.

In this preferred embodiment, a tag character or a tag moving image may be used as a replacement for a tag image. In this case, tag character data or tag moving image data (moving image information) is recorded in the ROM 16 as a replacement for tag image data, and a process for creating a tag character file (an example of a tag information file) or a tag moving image file (an example of a tag information file), etc. is performed similar to the above described tag image file.

FIG. 7A shows an example where a tag character file is recorded onto the medium 25, whereas FIG. 7B shows an example where a tag moving image file is recorded onto the medium 25.

In FIG. 7A, "F0001.txt" and "F0105.txt" indicate tag character files (character files in a text format). In FIG. 7B, "F0001.mov" and "F0105.mov" indicate tag moving image files (moving image files in a moving image format). Both the tag character files and the tag moving image files conform to an image file format such as Exif, etc. similar to a tag image file, etc., and their header portions include information such as a tag number, tag creation date and time, formatting date and time, file name, etc. similar to a tag image file.

As described above, a tag character file or a tag moving image file can be used as a replacement for a tag image file.

FIG. 7C exemplifies a display screen when the tag character files and the shot image files, which are shown in FIG. 7A and recorded onto the medium 25, are transferred to an external device, which lists and displays the transferred image files in type order.

In the example shown in FIG. 7C, the tag character files are displayed at first, and the shot image files are then displayed in file type order. Also in such a case, a user can extract associated shot image files from among the transferred image files by confirming the file names of the tag character files, in a similar manner as in FIGS. 6A, 6B, and 6C.

Up to this point, the electronic camera according to the present invention, a shooting method and a replaying method thereof are described in detail. The present invention is not limited to the above described preferred embodiment. Various types of improvements and modifications can be made in a scope that does not deviate the gist of the present invention, as a matter of course.

As described above in detail, according to the present invention, a plurality of shot image files recorded onto a shared recording medium can be handled as a meaningful image group.

What is claimed is:

1. An electronic camera having an insertable/removable recording medium for storing shot images, comprising:
    a tag memory storing a plurality of pieces of tag information in advance;
    a tag selection unit for selecting tag information to be corresponded to an image file of an image that is to be shot before the image is shot from the plurality of pieces of tag information stored in the tag memory;
    a tag information creation unit for creating a tag information file including the tag information selected by the tag selection unit; and
    a recording unit for recording the created tag information file onto the recording medium together with the image file of a shot image;
    an image file deletion unit for deleting the image file recorded onto the recording medium; and
    a file name giving unit for creating a file name and giving the file name to the tag information file, wherein:
    the tag information file created by the tag information creation unit is only one tag information file for the image file of the image that is to be shot as a distinction to distinguish a shot image from images to be shot, and a file name given to the tag information file by the file name giving unit is a name that is associated with a file name of the image file of the image that is to be shot and different from file names of the other tag information files recorded onto the recording medium; and
    when the image file deletion unit deletes from the recording medium an image file having a file name associated with a file name of a first tag information file, the file name giving unit gives the first tag information file a file name associated with a file name of an image file of an image shot next to an image of the deleted image file.

2. The electronic camera according to claim 1, wherein the tag information is still image data.

3. The electronic camera according to claim 2, wherein the created tag information file is enabled to be referenced whenever necessary.

4. The electronic camera according to claim 2, further comprising an operation mode for creating the tag information file.

5. The electronic camera according to claim 2, wherein the tag information file includes, as supplementary information, at least any one of a tag information number, tag information creation date and time, a file name of the tag information file, and formatting date and time which the tag information file is to be recorded in the recording medium.

6. The electronic camera according to claim 1, wherein at least one of a created date and time of a second tag information file included in the second tag information file and a formatted date and time of the recording medium is included in an image file of an image that was shot between the time the second tag information file was recorded in the recording medium after being created and the time a following tag information file is recorded in the recording medium after being created.

7. The electronic camera according to claim 1, wherein the tag information is moving image data.

8. The camera according to claim 1, wherein the file name associated with the file name of the image file is a file name including a part of the file name of the image file.

9. An electronic camera having an insertable/removable recording medium for storing shot images, comprising:
    a tag memory storing a plurality of pieces of tag information in advance;
    an image replaying unit for replaying an image stored on the recording medium;
    a tag selection unit for selecting one piece of tag information from the plurality of pieces of tag information stored in the tag memory;

a tag information creation unit for creating a tag information file including tag information selected by the tag selection unit as a tag information file corresponding to an image file of the image when the image is replayed by the image replaying unit; and an adding unit for additionally recording the tag information file onto the recording medium on which the image file corresponding to the tag information file is stored;

an image file deletion unit for deleting the image file recorded onto the recording medium; and a file name giving unit for creating a file name and giving the file name to the tag information file, wherein;

the tag information file created by the tag information creation unit is a distinction to divide a plurality of image files into groups of images and is only one tag information file for the image file of the image when the image is replayed by the image replaying unit, and a file name given to the tag information file by the file name giving unit is a name that is associated with a file name of the image file of the image when the image is replayed by the image replaying unit and different from file names of the other tag information files recorded onto the recording medium; and when the image file deletion unit deletes from the recording medium an image file having a file name associated with a file name of a first tag information file, the file name giving unit gives the first tag information file a file name associated with a file name of an image file on an image shot next to an image of the deleted image file.

10. The electronic camera according to claim 9, wherein the tag file is still image data.

11. The electronic camera according to claim 10, wherein the created tag information file is enabled to be referenced whenever needed.

12. The electronic camera according to claim 10, further comprising an operation mode for creating the tag information file.

13. The electronic camera according to claim 10, wherein the tag information file includes, as supplementary information, at least any one of a tag information number, tag information creation date and time, a file name of the tag information file, and formatting date and time at which the tag information file is to be recorded on the recording medium.

14. The electronic camera according to claim 9, wherein the tag file is moving image data.

15. The camera according to claim 9, wherein the file name associated with the file name of the image file is a file name including a part of the file name of the image file.

16. A shooting method for storing shot images shot on an electronic camera onto an insertable/removable recording medium, comprising:

selecting one piece of tag information from a plurality of pieces of tag information stored in a tag memory in advance before an image is shot;

creating a tag information file including the selected tag information corresponding to an image file of an image that is to be shot;

storing a shot and obtained image into the recording medium as a first image file;

creating a first file name associated with a file name of the first image file;

giving the first file name to the created tag information file so as to record the tag information file onto the recording medium;

creating a second file name associated with a file name of a second image file stored next to the first image file onto the recording medium, when the first image file is deleted from the recording medium; and changing the file name of the tag information file to the created second file name, wherein the tag information file created is only one tag information file for the image file of the image that is to be shot as a distinction to distinguish a shot image from images to be shot, and is different from the file names of the other tag information files recorded onto the recording medium.

17. A shooting method for an electronic camera according to claim 16, wherein the tag information is still image data.

18. A shooting method for an electronic camera according to claim 16, wherein the tag information is moving image data.

19. The shooting method of an electronic camera according to claim 16, wherein:

the first file name associated with the file name of the first image file is a file name including a part of the file name of the first image file; and the second file name associated with the file name of the second image file is a file name including a part of the file name of the second image file.

20. An image replaying method for storing images shot on an electronic camera onto an insertable/removable recording medium, comprising:

selecting an image displayed on a monitor screen of the electronic camera;

selecting one piece of tag information from a plurality of pieces of tag information stored in a tag memory in advance;

creating a tag information file including the selected tag information and corresponding to a first image file of the selected image;

giving a first file name associated with a file name of the first image file to the created tag information file;

recording the tag information file onto the recording medium on which the image file corresponding to the tag information file is stored, the first file name being given to the tag information file;

creating a second file name associated with a file name of a second image file shot next to the first image file from among images stored onto the recording medium, when the first image file is deleted from the recording medium; and changing a file name of the tag information file to the created second file name, wherein the tag information file created is a distinction to divide a plurality of image files into groups of images and is only one tag information file for the image file of the image when the image is replayed, and is different from file names of the other tag information files recorded onto the recording medium.

21. A shooting method for an electronic camera according to claim 20, wherein the tag information is still image data.

22. A shooting method for an electronic camera according to claim 20, wherein the tag information is moving image data.

23. The shooting method of an electronic camera according to claim 15, wherein:

the first file name associated with the file name of the first image file is a file name including a part of the file name of the first image file; and the second file name associated with the file name of the second image file is a file name including a part of the file name of the second image file.

* * * * *

UNITED STATES PATENT AND TRADEMARK OFFICE
CERTIFICATE OF CORRECTION

| | |
|---|---|
| PATENT NO. | : 7,583,298 B2 |
| APPLICATION NO. | : 10/637464 |
| DATED | : September 1, 2009 |
| INVENTOR(S) | : Shinya Takasumi |

It is certified that error appears in the above-identified patent and that said Letters Patent is hereby corrected as shown below:

IN THE CLAIMS

In claim 16, at column 13, lines 55-56, cancel the text stating "information corresponding to an image file of an the image that is to be shot" and replace it with the following: --information corresponding to an image file of the image that is to be shot--.

Signed and Sealed this

Twenty-fifth Day of May, 2010

David J. Kappos
*Director of the United States Patent and Trademark Office*